May 3, 1927.
R. LA FRANCE
1,626,737
MEANS FOR FORMING CHARGES OF MOLTEN GLASS
Filed Sept. 30, 1921   2 Sheets-Sheet 1
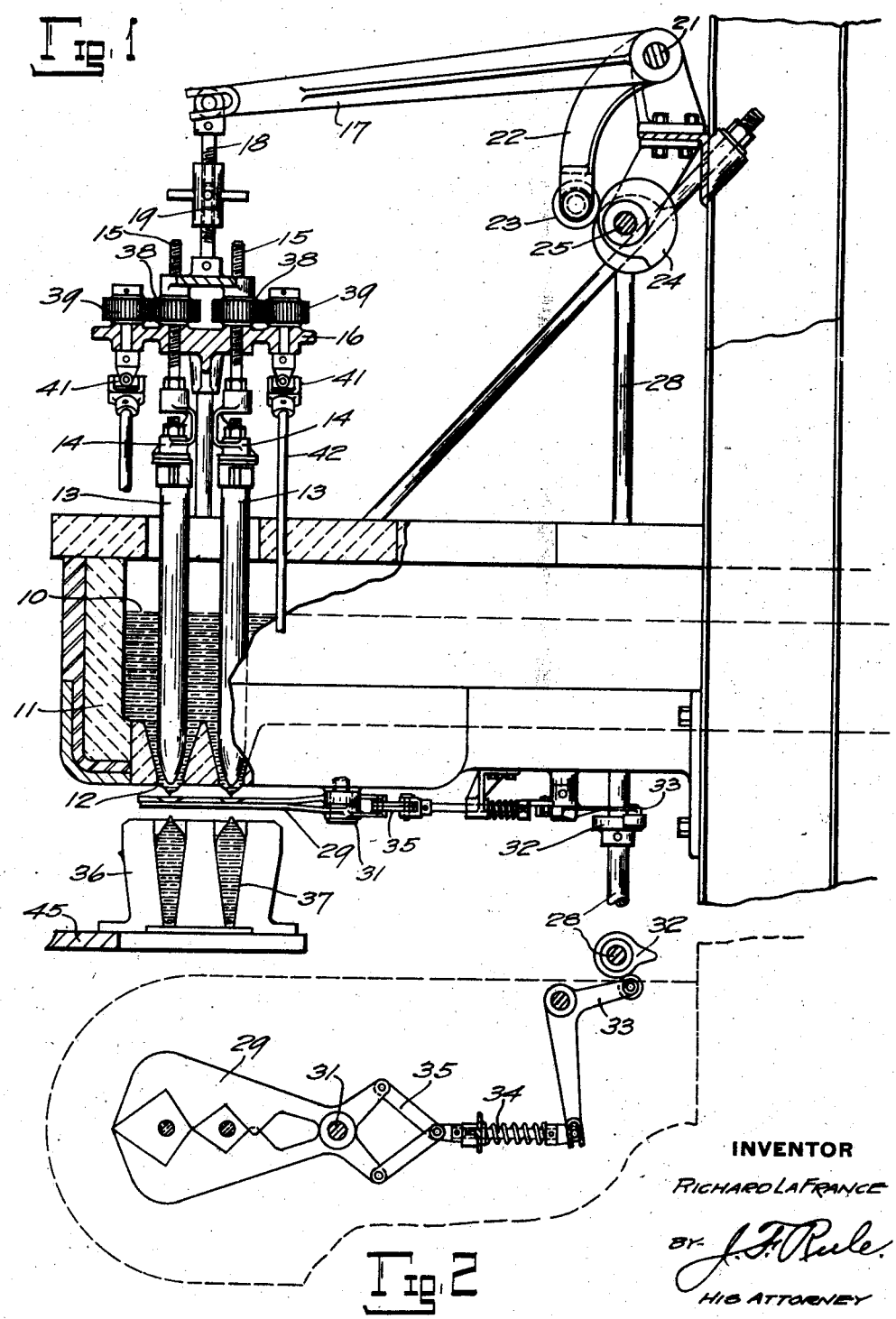
INVENTOR
RICHARD LA FRANCE
BY J.F. Rule
HIS ATTORNEY May 3, 1927. 1,626,737
R. LA FRANCE
MEANS FOR FORMING CHARGES OF MOLTEN GLASS
Filed Sept. 30, 1921 2 Sheets-Sheet 2
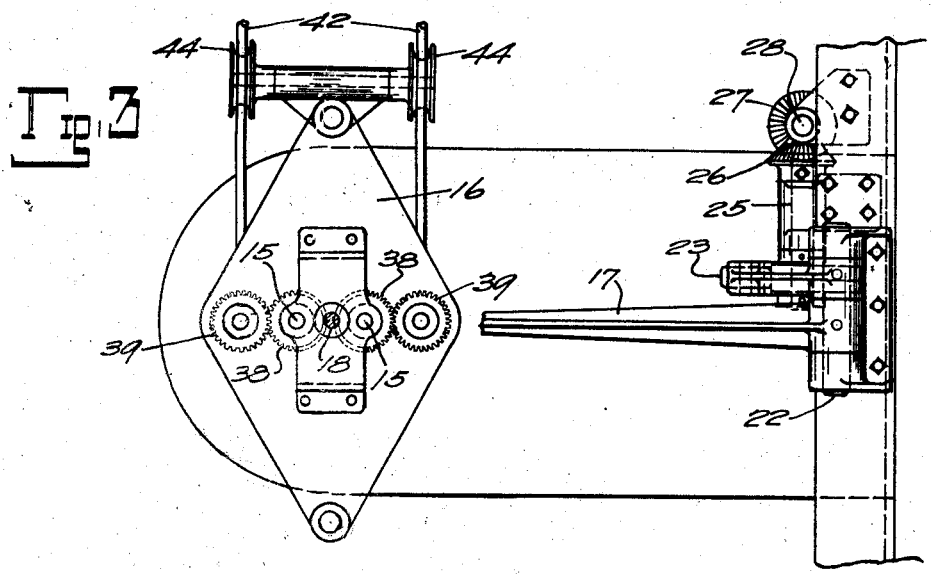
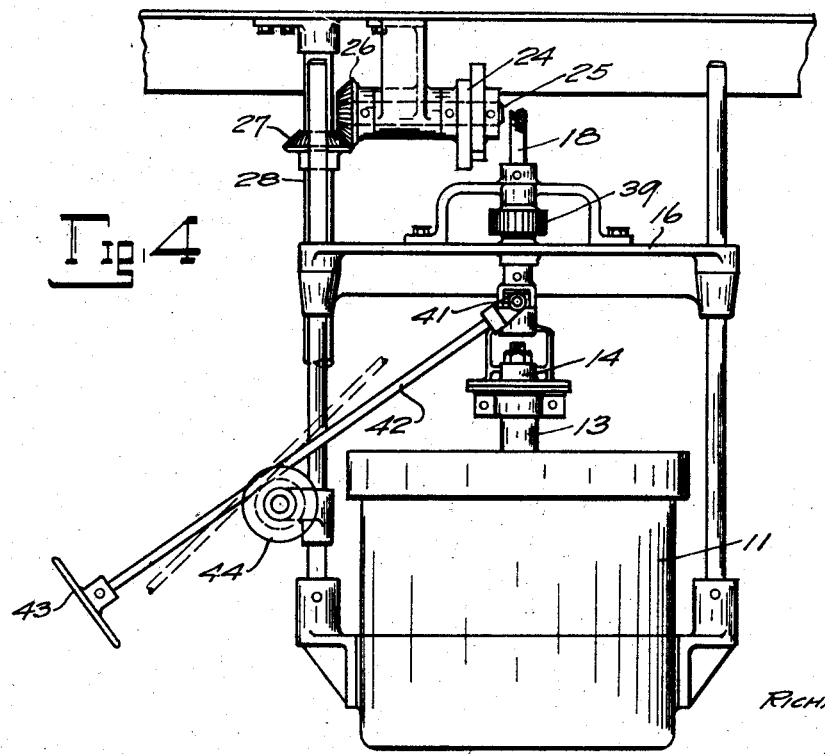
INVENTOR
RICHARD LA FRANCE
BY J. F. Rule
HIS ATTORNEY Patented May 3, 1927.

1,626,737

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR FORMING CHARGES OF MOLTEN GLASS.

Application filed September 30, 1921. Serial No. 504,278.

My invention relates to apparatus for producing individual masses or charges of molten glass and delivering them to the molds of a glass forming machine. An object of the invention is to provide suitable means for simultaneously producing a plurality of charges. A further object of the invention is to provide adjusting means by which the size or volume of each of said charges may be adjusted independently of the others.

Other objects of the invention will appear hereinafter.

In the accompanying drawings:

Figure 1 is a part sectional elevation of an apparatus constructed in accordance with my invention.

Figure 2 is a plan view of the cutting mechanism.

Figure 3 is a plan view of the mechanism shown in Figure 1, parts being broken away.

Figure 4 is a front elevation of the apparatus.

Molten glass 10 in a boot or extension 11 of a tank furnace issues through outlet openings 12 in the bottom of the boot. The flow of glass is controlled by plugs or plungers 13 which are arranged to reciprocate vertically in the glass above the openings 12. The plugs are made of fire clay or other refractory material and are removably clamped in metal holders 14 to which are also connected screw threaded rods 15 connected to a head 16. The head is carried by a rock arm 17 to which it is connected through a sectional link 18. An adjusting sleeve 19 has right and left hand screw threaded connections with the link sections whereby the length of the link may be adjusted to adjust the head 16 up and down.

The arm 17 is fixed to a rock shaft 21 to which is also connected an arm 22 having a cam roll 23 to run on a cam 24 on a horizontal shaft 25. Bevel gears 26 and 27 form a driving connection between the shaft 25 and a continuously rotating drive shaft 28. Each complete rotation of the drive shaft imparts a rotation to the cam and through the connections just described moves the head 16 and plungers 13 up and down. The plungers as they move downward, exert an expelling force on the glass, and when they are moved upward, exert a retarding action on the glass. They also act as valves to restrict the flow when in their lowered positions. The plungers thus operate to control the flow and produce suspended masses or gobs of glass in a manner well known to those skilled in the art.

The gobs are severed by a pair of shears 29 having a fulcrum 31. The shears are actuated by a cam 32 on the drive shaft 28, which cam operates through a bell crank lever 33, rod 34 and toggle links 35 to reciprocate the shear blades. Any approved form of shear mechanism might be employed, it being understood that the operation of the shears is synchronized with the movements of the plungers. The shears are preferably so formed that they will simultaneously sever the suspended gobs. The latter, as indicated in Figure 1, are dropped into a plural mold 36, that is to say, a mold having a plurality of mold cavities 37. The number of mold cavities may be increased, if desired. The gob forming apparatus can also be constructed to simultaneously produce either two or more gobs, corresponding to the number of mold cavities.

The rods 15 are connected to the head 16 by means of gears 38 which are screw threaded on the rods. Pinions 39 running in mesh with the gears 38 are carried by the head 16 and are connected through universal joints 41 with adjusting rods 42 on the lower ends of which are hand wheels 43 for rotating the rods. It will be seen that either plunger can be adjusted up and down independently of the other by rotating the corresponding hand wheel 43. This adjustment may readily be effected while the feeder is in operation. The rods 42 are supported on rolls 44. By adjusting a plunger 13 up or down, the extent to which it restricts the corresponding outlet 12 is varied, resulting in a corresponding variation in the weight or volume of the gobs controlled by said plunger. The weight of the charges of glass may thus be independently and differentially varied. The weight of both charges may be simultaneously increased or decreased by adjusting the head 16 up and down by means of the adjusting sleeve 19. The molds 36 are carried on a rotating mold table or carriage 45 of a glass forming machine which may be provided with an annular series of such molds.

Modifications may be resorted to within the spirit and scope of my invention.

What I claim is:

1. The combination of a container for molten glass having a plurality of outlet openings through which the glass issues, devices for individually controlling the glass issuing from the respective outlets, and means to independently adjust said devices.

2. The combination of a container for molten glass having a plurality of outlet openings through which the glass issues, devices for individually controlling the glass issuing from the respective outlets, and means to relatively adjust said devices and thereby effect a corresponding relative adjustment in the amount of glass issuing from the respective outlets.

3. The combination of a container for molten glass having a plurality of discharge outlets through which the glass is extruded, means for periodically severing the extruded glass and thereby producing individual masses or gobs of glass, controlling devices individual to said outlets and controlling the size of said gobs, and means to relatively adjust said devices in a manner to vary the relative sizes of the gobs.

4. The combination of a container for molten glass having a plurality of discharge outlets through which the glass is extruded, means for periodically severing the extruded glass and thereby producing individual masses or gobs of glass, valves controlling said outlets, and means to independently adjust said valves and thereby independently adjust the size of gobs delivered from the respective outlets.

5. The combination of a container for molten glass having openings in the bottom thereof through which the glass issues, plugs extending into the glass above said openings, means to simultaneously reciprocate said plugs, and means to effect a relative vertical adjustment of said plugs.

6. The combination of a container for molten glass having openings in the bottom thereof through which the glass issues, plugs extending into the glass over said openings, a head carrying said plugs, means to move the head up and down, and means to separately adjust the plugs up and down in said head.

7. The combination of a container for molten glass having outlet openings in the bottom thereof through which the glass issues, a mold having a plurality of mold cavities and movable into position to bring said cavities respectively beneath said outlets, devices to control the flow of glass and thereby produce individual masses or gobs suspended from the walls of said outlets, means to simultaneously sever said gobs and cause them to drop into the mold cavities, and means to separately adjust said controlling devices and thereby vary the weight of the gobs.

8. The combination of a container for molten glass, having a plurality of outlet openings through which the glass issues simultaneously to form a plurality of charges, regulating means by which the issuance of glass through each outlet opening is independently controlled, whereby the relative sizes of the charges of glass issuing from the respective outlets may vary, and means below the outlets to sever the plurality of charges of glass.

9. The combination of a container for molten glass, having a plurality of downwardly directed outlet openings through which the glass issues, means for regulating the discharge of glass and causing it to be suspended from the walls of the outlet, said regulating means operable to cause a larger mass to be suspended from the walls of one outlet than from the other, and movable means to simultaneously sever said masses.

10. The combination of a container for molten glass having a plurality of outlet openings of equal size through which the glass issues, regulating means by which a larger quantity of glass is caused to issue from one outlet than from another, and means to periodically sever unequal quantities of issued glass.

11. The combination of a container for molten glass having outlet openings in the bottom thereof through which the glass issues, periodically actuated means for controlling the discharge of glass and producing separate masses of glass suspended from the walls of the respective outlets, said regulating means operable to cause a larger mass to be suspended from one outlet than from the other, and means for severing the suspended masses.

12. The combination of a glass furnace having an extension communicating therewith, said extension having a plurality of outlet openings through which the glass issues, devices for individually controlling the glass issuing from the respective outlets, and means to independently adjust said devices.

13. The combination of a glass furnace having an extension communicating therewith, said extension having a plurality of outlet openings through which the glass issues simultaneously to form a plurality of charges, regulating means by which the issuance of glass through each outlet opening is independently controlled, whereby the relative sizes of the charges of glass issuing from the respective outlets may vary, and means below the outlets to sever the plurality of charges of glass.

14. The combination of a glass furnace having an extension communicating therewith, said extension having a plurality of outlet openings of equal size through which the glass issues, regulating means by which a larger quantity of glass is caused to issue from one outlet than from another, and means to periodically sever unequal quantities of issued glass.

Signed at Toledo, in the county of Lucas and State of Ohio, this 27th day of September, 1921.

RICHARD LA FRANCE.